United States Patent
Haarstrich et al.

(10) Patent No.: US 11,327,288 B2
(45) Date of Patent: May 10, 2022

(54) METHOD FOR GENERATING AN OVERVIEW IMAGE USING A LARGE APERTURE OBJECTIVE

(71) Applicant: Carl Zeiss Microscopy GmbH, Jena (DE)

(72) Inventors: Jakob Haarstrich, Jena (DE); Jörg Siebenmorgen, Jena (DE); Helge Eggert, Jena (DE); Martin Beck, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 17/052,560

(22) PCT Filed: Jun. 4, 2019

(86) PCT No.: PCT/EP2019/064521
§ 371 (c)(1),
(2) Date: Nov. 3, 2020

(87) PCT Pub. No.: WO2020/001938
PCT Pub. Date: Jan. 2, 2020

(65) Prior Publication Data
US 2021/0239961 A1    Aug. 5, 2021

(30) Foreign Application Priority Data
Jun. 28, 2018 (DE) .................... 10 2018 210 603.7

(51) Int. Cl.
*G08B 21/00* (2006.01)
*G02B 21/36* (2006.01)
*G02B 21/00* (2006.01)

(52) U.S. Cl.
CPC ....... *G02B 21/367* (2013.01); *G02B 21/0032* (2013.01); *G02B 21/0076* (2013.01)

(58) Field of Classification Search
CPC .............. G02B 21/367; G02B 21/0032; G02B 21/0076; G02B 21/361
See application file for complete search history.

(56) References Cited

U.S. PATENT DOCUMENTS

| | | |
|---|---|---|
| 9,494,785 B2 | 11/2016 | Wereley et al. |
| 2011/0304723 A1 | 12/2011 | Betzig |

(Continued)

FOREIGN PATENT DOCUMENTS

| | | |
|---|---|---|
| DE | 10 2014 102 215 | 8/2015 |
| DE | 10 2015 209 756 | 12/2016 |

(Continued)

OTHER PUBLICATIONS

International Search Report dated Oct. 11, 2019 in PCT/EP2019/064521 with English translation, 5 pages.

(Continued)

*Primary Examiner* — Frank F Huang
(74) *Attorney, Agent, or Firm* — Grüneberg and Myers PLLC

(57) ABSTRACT

A method is useful for generating an overview image using a high-aperture objective. An optical detection beam path with the objective is provided. The path is transferred into a second operating state via a first depth of field increased to a second depth of field. Detection radiation is captured in the second operating state. Detection radiation coming from the (Continued)

sample space is collected by the objective, guided along the path, and captured by a detector sensitive to detection radiation as an image with a lateral image field, which is the same in the first and second operating states.

20 Claims, 10 Drawing Sheets

(56) References Cited

U.S. PATENT DOCUMENTS

| | | | | |
|---|---|---|---|---|
| 2012/0099190 A1* | 4/2012 | Knebel | ............... | G02B 21/367 359/385 |
| 2012/0162755 A1* | 6/2012 | Stroessner | ........... | G02B 21/086 359/386 |
| 2012/0176674 A1* | 7/2012 | Lippert | ............. | G02B 21/0032 359/388 |
| 2012/0200693 A1* | 8/2012 | Lippert | ............... | G02B 21/002 348/79 |
| 2012/0224034 A1 | 9/2012 | Kalkbrenner et al. | | |
| 2012/0229791 A1* | 9/2012 | Lippert | ............. | G02B 21/0064 356/23 |
| 2012/0281264 A1* | 11/2012 | Lippert | ................. | G02B 21/16 359/199.3 |
| 2018/0203217 A1* | 7/2018 | Knebel | ............... | G02B 21/006 |

FOREIGN PATENT DOCUMENTS

| | | |
|---|---|---|
| WO | 2013/106731 | 7/2013 |
| WO | 2016/189012 | 12/2016 |
| WO | 2017/013054 | 1/2017 |
| WO | 2017/075275 | 5/2017 |

OTHER PUBLICATIONS

Written Opinion dated Oct. 11, 2019 in PCT/EP2019/064521 with English translation, 9 pages.
Search Report dated Jan. 15, 2019 in German Application No. 10 2018 210 603.7, 8 pages.
King et al., "*Spatial light modulator phase mask implementation of wavefront encoded 3D computational-optical microscopy*," Applied Optics; 2015, 54(29):8587-8595.
Ritter et al., "*A cylindrical zoom lens unit for adjustable optical sectioning in light sheet microscopy*," Biomedical Optics Express; 2011, 2(1):185-193.

* cited by examiner

METHOD FOR GENERATING AN OVERVIEW IMAGE USING A LARGE APERTURE OBJECTIVE

CROSS-REFERENCE TO RELATED APPLICATIONS

This application is the National Stage entry under §371 of International Application No. PCT/EP2019/064521, filed on Jun. 4, 2019, which claims the benefit of German Application No, 10 2018 210 603.7, filed on Jun. 28, 2018. The content of each of these applications is hereby incorporated by reference in its entirety.

BACKGROUND OF THE INVENTION

Field of the Invention

The invention relates to a method for generating an overview image using a high-aperture objective.

Description of Related Art

Microscopy methods are usually used to examine small sections of larger objects. So-called overview images are often created to find a suitable section for the examinations and observations to be carried out.

In conventional (wide-field) microscopes and laser scanning microscopes (LSM), the overview image is usually captured using an objective whose magnification is less than the magnification of an objective used for the actual examination. A smaller magnification is accompanied by an increase in the field of view, and so large regions of a sample can be imaged very quickly. However, as a rule, the reduction in the magnification also leads to a reduction in the numerical aperture (NA) and consequently to a reduction in the lateral and axial resolution of the detection system. However, a high resolution can be dispensed with for an overview image.

On the basis of these overview images, a user is able to define a section of the sample suitable for the examination (region of interest, ROI). By way of example, this could be a certain cell of a cell cluster or of biological tissue, which can subsequently be observed and imaged using an objective with a high magnification and a high resolution.

If it is not possible to switch between objectives with different magnifications in a microscope system, or should this only be possible with major disadvantages, the user is dependent on the objective present in each case. Such systems without the option of a simple change between different objectives do not have a changer unit for cost reasons, for example, or particularly demanding tolerances have to be observed when adjusting the respective objective.

Should a microscope be set to the use of an existing objective with a particularly high magnification, overview images can only be recorded very slowly since small sections of the sample are captured with a high data density.

Light sheet microscopes are an example of microscope systems in which an objective change is at least difficult and whose usually employed objective has a high magnification and a small depth of field. In these, a thin light sheet is directed into a sample volume to be imaged and an image of the sample plane illuminated thus is captured on the basis of captured detection radiation by means of an objective of a detection beam path. By way of example, the light sheet can be generated as a static light sheet by means of a cylindrical lens in the illumination beam path or it can be generated by means of a light beam that is moved (scanned) in the light sheet plane (dynamic light sheet). The depth range from which detection radiation can be captured is further restricted by the thin light sheet, on top of the restricted depth of field of the objective.

As a rule, light sheet microscopes are used for three-dimensional recordings of biological samples. By way of example, a large number of individual recordings are required to create a three-dimensional overview image using light sheets; this takes up a lot of time and requires high computing power.

BRIEF SUMMARY OF THE INVENTION

The invention is based on the object of proposing a method which allows two-dimensional and three-dimensional overview images of a sample volume to be created quickly and without requiring the objective of the detection beam path to be changed to this end.

The object is achieved by a method as described in a below embodiment. Advantageous developments are the subject matter of further embodiments.

The method according to the invention serves to generate and optionally provide an overview image using a high-aperture objective. By way of example, a high-aperture objective has a numerical aperture of NA=0.5; 0.6; 0.75 or more, for example 1.0. The objectives can be embodied as immersion objectives. By way of example, water is a suitable immersion medium.

The method comprises the following steps which are carried out in the specified sequence, with intermediate steps not specified here being possible in further configurations of the method.

An optical detection beam path with the objective is provided. By way of example, the detection beam path can be present in a microscope and can be provided therewith. The detection beam path can have two operating states, these being able to be set manually or under automatic control. In a first operating state, the detection beam path has a first numerical aperture and a first depth of field in a focal plane of the detection beam path, Using the detection beam path in the first operating state, an image of detection radiation is captured with the first depth of field and a lateral image field. Optionally, a plurality of images could also be captured with the first depth of field. The detection radiation is caused by virtue of at least one light sheet being directed along an illumination axis into a sample volume to be imaged, which is situated in the sample space.

So that the light sheet, in particular the extent (thickness) thereof in the direction of a detection axis of the objective, can be adapted to the second depth of field, use is preferably made of an adjustable illumination apparatus for generating the light sheet or light sheets.

The thickness of the light sheet or the light sheets can deviate from the depth of field of the detection objective in the first operating state. In particular, the depth of field of the detection objective can be smaller than the thickness(es) of the light sheet or light sheets. By contrast, the depth of field of the detection objective and the light sheet thickness(es) are preferably the same in the second operating state.

In a further method step, the detection beam path is transferred into a second operating state by virtue of the first depth of field being increased to a second depth of field. Here, the high-aperture objective remains in the detection beam path.

Once the second operating state has been established, detection radiation coming from a sample space, in particular from a sample volume to be examined, is captured. The detection radiation is collected by means of the objective, guided along the detection beam path and captured in an image plane by means of at least one detector, which is sensitive to detection radiation, as an image with a lateral image field. The lateral image fields are largely the same in the first and second operating state.

The depth of field specifies that distance range in front of the objective from which emanating detection radiation imaged into an image plane of the detection beam path yields a high-detail, sharp image. Thus, a second depth of field that is increased in relation to a first depth of field is characterized by a greater absolute distance range. The mean relative positions of the distance ranges of the first and second depth of field can be the same.

DETAILED DESCRIPTION OF THE INVENTION

Figure 1:
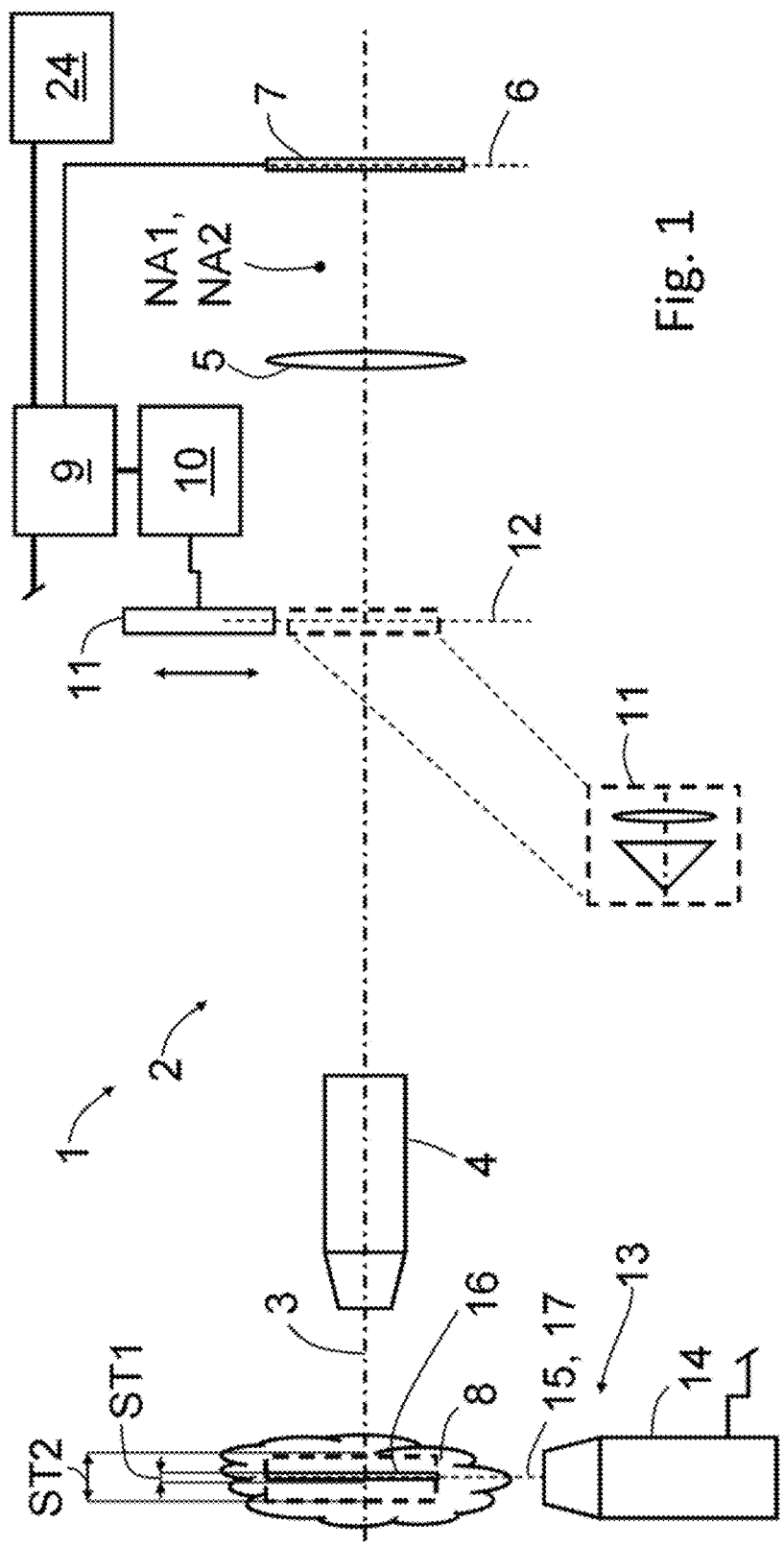
FIG. 1 shows a schematic illustration of a first exemplary embodiment of a microscope with a detection beam path and an optical element that can be pivoted therein.

In this description, the term numerical aperture relates to the detection beam path unless expressly stated otherwise.

The depth of field can be ascertained, in particular calculated, in a known manner. Here, use is made of the wave-optical depth of field, A calculation can be carried out using the general formula $d=\lambda/(2*n*\sin(u)^2)$. Here, $\lambda$ is the wavelength, n is the refractive index and u is the aperture angle. By way of example, to approximate the full width at half maximum in the direction of the Z-axis, use can also be made of $1.67*\lambda*n/NA^2$.

The second depth of field is increased in relation to the first depth of field by at least a factor of two, but advantageously by a factor ranging between two and ten, for example ranging between four and nine. The depth of field can be increased using different measures.

One option consists of reducing the numerical aperture of the detection beam path. To this end, a stop, in particular a pinhole or slit stop, can be introduced in a pupil plane of the detection beam path, the effect of which being a reduction in the numerical aperture of the detection beam path.

The stop can be pivoted or inserted into the detection beam path. In further configurations, a controllable stop element present in the detection beam path can also be used. By way of example, an LCD (liquid crystal display) element can be present in, or introduced into, the detection beam path. Depending on requirements, the stop element is controlled by means of a control unit and a respectively desired aperture width and shape of the opening are set. A stop whose aperture width is mechanically adjustable could also be arranged in the detection beam path. The adjustable stops can be used both in the first operating state and when generating the second operating state. It is also possible for an adjustable stop to be pivoted into or out of, or inserted into or removed from, the detection beam path.

Advantageously, the numerical aperture of the first operating state is reduced by a factor of 0.5 or less, for example 0.3. This achieves a sufficiently large increase in the second depth of field by approximately a factor of four or nine. By way of example, reducing the numerical aperture from NA=1.0 to NA=0.3 (=a factor of 0.3) and adapting the increments of the detection allows an approximately ten-Fold faster creation of the overview image, as will still be explained in more detail below.

A further option for increasing the second depth of field is rendered possible by applying the extended depth of focus (EDoF) principle. To this end, various measures that can be used in the method according to the invention are known.

By way of example, a phase mask can be introduced into the detection beam path, as described in King et al. (King, S. V. et al. (2015), Spatial light modulator phase mask implementation of wavefront encoded 3D computational-optical microscopy; Applied Optics 54: 8587-8595). By introducing a cubic phase mask into the pupil of the detection beam path, a PSF which has the form of an Airy beam is generated. This PSF has a greatly increased axial extent and consequently facilitates imaging with a greatly increased depth of field.

In a further configuration of the method, an axicon and, optionally, a pair of convex optical lenses could be arranged in the detection beam path (U.S. Pat. No. 9,494,785 B2).

The focal length can also be increased by virtue of introducing an annular stop into a pupil plane of the detection beam path.

Further, an additional refractive optical element could be introduced into the detection beam path for the purposes of axially lengthening the point spread function (PSF), as known from WO 2017/075275 A1. Here, spherical aberrations are generated in a targeted fashion by means of a refractive optical element introduced between the objective and the sample to be imaged, said spherical aberrations leading to an elongated PSF in the direction of the detection axis of the objective.

The detection radiation can be reflected illumination radiation or spectral components of illumination radiation. The sample to be imaged or constituent parts thereof can also be excited to emit detection radiation. In particular, suitable molecules can be excited to emit fluorescence radiation as detection radiation by using excitation radiation as illumination radiation.

In a further possible approach for increasing the depth of field, detection radiation from a plurality of object planes lying parallel to one another is captured at the same time. To this end, a plurality of light sheets can be generated and used in the different object planes, i.e., planes in the sample volume.

Thus, for example, it is possible for a sample volume to be imaged to be illuminated along a respective illumination axis by a first light sheet and at least one further light sheet arranged parallel to the first light sheet, wherein the light sheets lie in succession and overlap at most in part along a detection axis of the objective perpendicular to the illumination direction (US 2012/0224034 A1):

Alternatively, a sample volume to be imaged can be illuminated in an illumination direction and along a respective illumination axis by a first light sheet and at least one further light sheet arranged parallel to the first light sheet. Detection radiation caused by the respective light sheets is captured along a detection axis. Each further light sheet is generated in displaced fashion in relation to the first light sheet both in the detection direction, i.e. along the detection axis, and in the illumination direction. The detection radiation of all light sheets is captured at the same time (WO 2016/189012 A1).

Without light sheets, detection radiation of different object planes can be captured with an increased depth of field by virtue of a grating being introduced into a Fourier plane of the detection beam path, by means of which detection radiation comprising a plurality of wavelengths is split into components corresponding to the orders of diffraction thereof and the components of the orders of diffraction are directed at different regions of an image plane at the same time. In the image plane, the components of the individual orders of diffraction can be captured separately by means of a suitable detector, as known from WO 2013/106731 A1.

In addition to a two-dimensional representation, the method according to the invention advantageously also facilitates a fast creation of a three-dimensional overview image. To this end, the light sheet is moved relative to the sample volume following the capture of an image of the sample volume in the second operating state with a first relative position of the light sheet. The light sheet remains in the focal plane of the objective despite the relative movement between light sheet and sample volume. The images of the light sheets offset thus can be stored and can be stitched together by means of a computer to form a three-dimensional overview image.

In order to achieve a high speed when capturing the individual images and creating the overview image, the light sheets are each offset by increments at which there is no overlap, or only a small overlap, between the individual light sheets. By way of example, the individual light sheets overlap by no more than 50%, but preferably by no more than 40%, for example 30%, 25%, 10% or 0% of their thickness. Here, reference is made to the extent of the light sheets in the region of the lateral image field.

The advantageous improvement in the capture speed achieved by means of the method according to the invention is illustrated using a numerical example:

In the case of a system with a 10× objective and a numerical aperture of the detection beam path of NA=1.0 (with water immersion), the full width at half maximum $FWHM_{x,y}$ (full width at half maximum) is approximately 250 nm and the full width at half maximum in the z-direction $FWHM_z$ ($\approx$depth of field) is approximately 1000 nm. Thus, an image has to be recorded approximately every 300 nm (300 nm increment) in the case of a conventional procedure.

Restrictions in respect of the lateral resolution are usually accepted when generating an overview image. Thus, for example in the case of an overview image with a 10× objective and NA=0.3, the lateral full width at half maximum $FWHM_{x,y}$ is approximately 900 nm and in the z-direction $FWMH_z$ is even 10-14 μm, depending on immersion medium employed. In a conventional procedure when capturing (sampling) images, an image has to be recorded every 3-4 μm (3-4 μm increment).

Thus, if the detection beam path has a numerical aperture of NA=0.3, approximately 10× fewer images have to be captured than when using a detection beam path with NA=1.0.

Exploiting the increased second depth of field with reduced numerical aperture requires a light sheet with a thickness that corresponds to at least the second depth of field and advantageously equals the second depth of field. By reducing the numerical aperture of the detection objective, for example from NA=1.0 to NA=0.3 with the aid of a pupil stop, and increasing the light sheet thickness, it is thus possible to achieve an increase in the depth of field by a factor of approximately 10, if a reduced axial and lateral resolution is accepted. Accordingly, three-dimensional overview images can be captured and provided ten times as fast. Even higher factors are possible with even lower resolution requirements. The lateral image field is maintained.

The configuration options of the method according to the invention presented above primarily relate to applications where the detection axis is directed in substantially perpendicular fashion at the sample volume to be imaged and, for example, intersects a currently generated light sheet in perpendicular fashion.

The proposed method is also applicable to situations where the detection axis is not directed at the sample or at a light sheet in perpendicular fashion. Here, substantial advantages are already obtained for two-dimensional overview images.

One example relates to the creation of an overview image of a sample or of a sample volume in a standard sample carrier such as a Petri dish, a multiwell plate or a flat sample carrier made of glass or plastic in an inverted light sheet microscope. As a rule, the samples rest on these sample carriers and are low in height in relation to their spread on the sample carrier. Examples of this include biological cells, which have a sample thickness H of approximately 10-30 μm and a lateral extent up into the millimeter range. However, even other organisms, such as zebrafish or worms, usually lie flat on the sample carrier.

For this reason, the user would like to obtain an overview image on the basis of which they can orient themselves parallel to the sample carrier, obtain an overview of the cell structures, cell organelles, the cells themselves or sections of the organisms situated next to one another there, and select a section (ROI) for a high-resolution image capture. It should be possible to quickly record such a lateral overview image.

To this end, a light sheet can be directed into the sample volume in the second operating state. The sample rests on a surface of the sample carrier serving as a support surface. Therefore, the sample volume is delimited in one direction by the support surface.

The illumination axis includes an angle α of less than 90° with the support surface; the support surface and the sample volume are therefore illuminated in oblique fashion by the light sheet. The detection axis is directed at the light sheet in perpendicular fashion and therefore likewise directed at the support surface in oblique fashion.

By way of example, the numerical aperture of the detection beam path is reduced in order to bring about the second depth of field. At the same time, the extent of the light sheet is increased in the direction of the detection axis such that it coincides with at least the second depth of field. It is possible to capture a number of images, with the light sheet being offset relative to the sample volume for each image capture, which advantageously corresponds to no more than the second depth of field.

To obtain a 2D overview image, there must subsequently be a transformation of the 3D information into a plane that the user can handle as easily as possible. In the case of the inverted light sheet microscope, this is usually a plane parallel to the support surface of the sample carrier. By way of example, this transformation could be a projection. Alternatively, a 3D overview could be displayed, just like in the orthogonal case described above.

The projection is ideally carried out in the direction of the detection axis of the objective, as a result of which the greatest possible resolution of the objective is usable. The image data are projected by computation into the plane of the support surface with only a slight deterioration therein as a consequence of the geometry factor to be applied.

The method according to the invention can also be used for systems with an objective interchanging device. This can avoid an objective change, for example to circumvent positioning tolerances or else to simplify the workflow. The disadvantage of the unchanging image field is accepted in the process.

Figure 2:
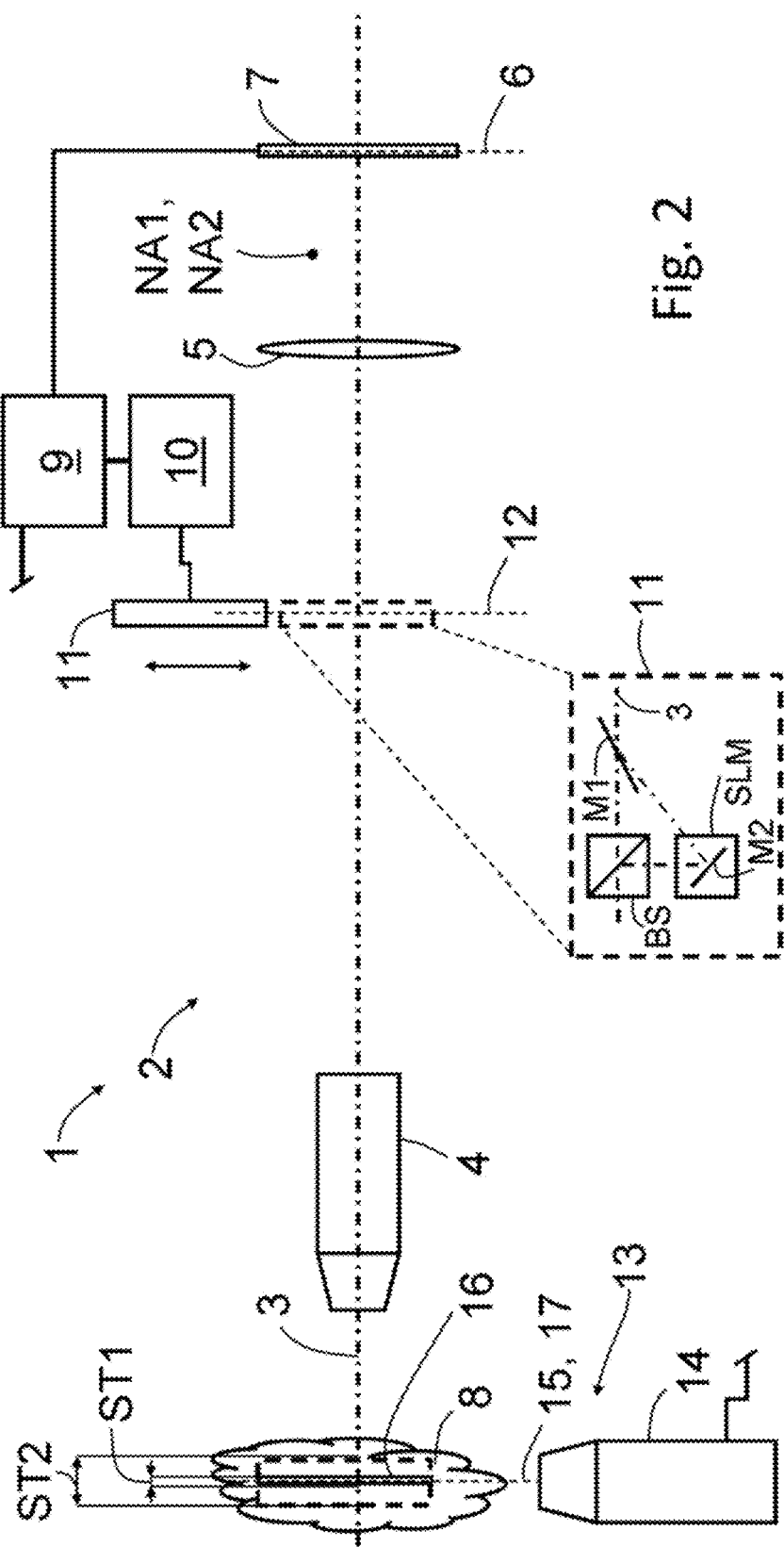
FIG. 2 shows a schematic illustration of a second exemplary embodiment of a microscope with a detection beam path and an optical element that can be pivoted therein.
Figure 3:
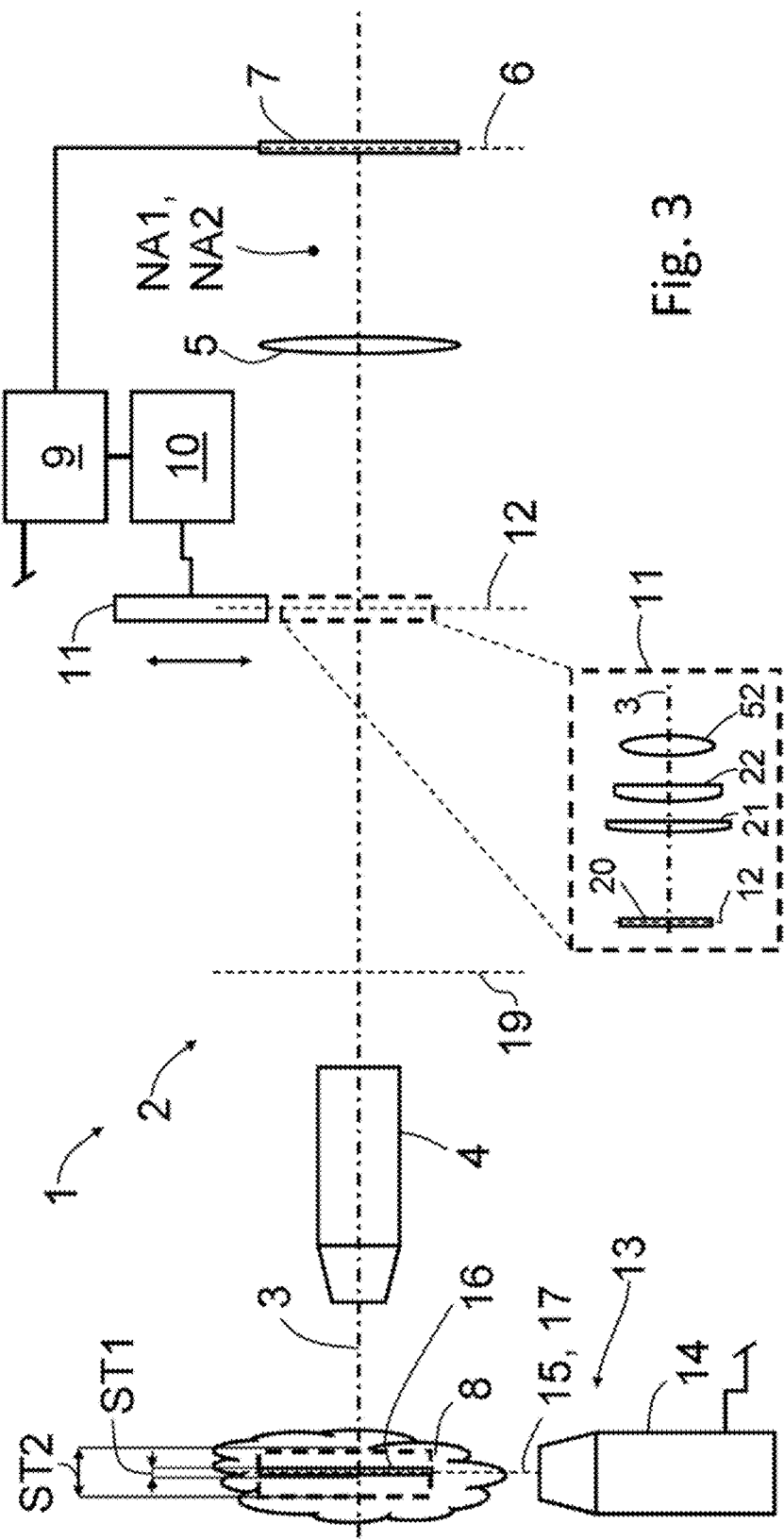
FIG. 3 shows a schematic illustration of a third exemplary embodiment of a microscope with a detection beam path and an optical element that can be pivoted therein.
Figure 4:
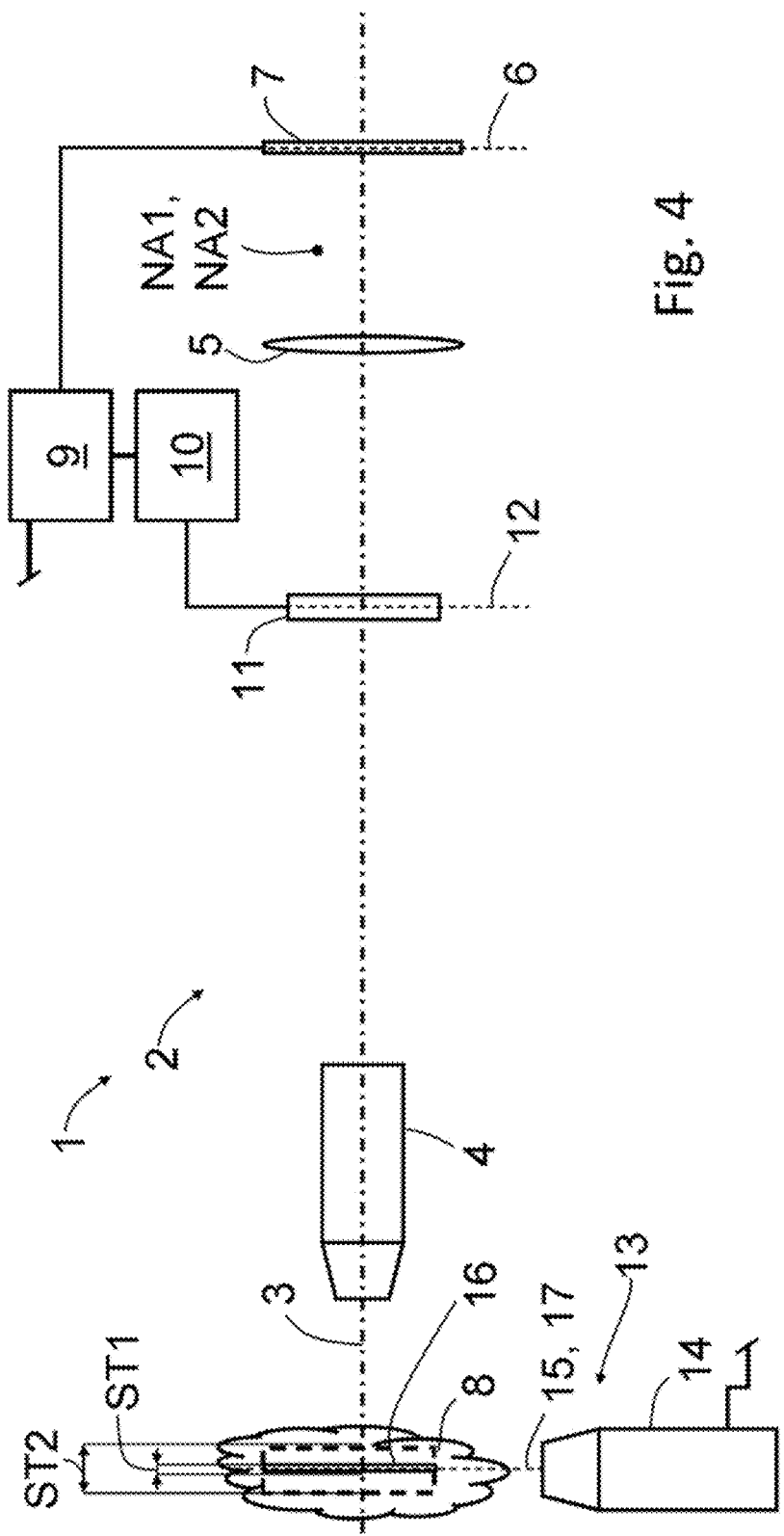
FIG. 4 shows a schematic illustration of a microscope with a detection beam path and a closable optical element.
Figure 5:
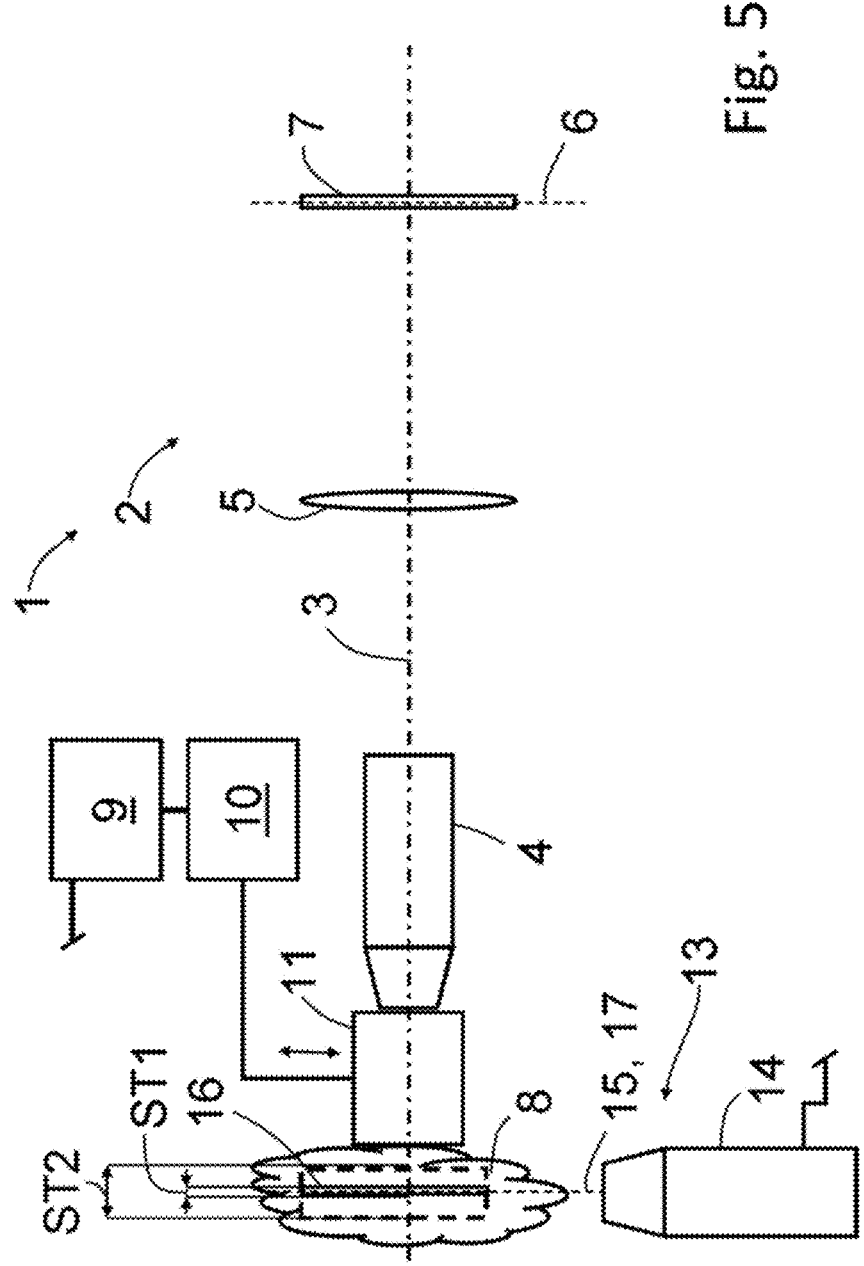
FIG. 5 shows a schematic illustration of a microscope with an additional refractive element in the detection beam path between the objective and sample volume.
Figure 6:
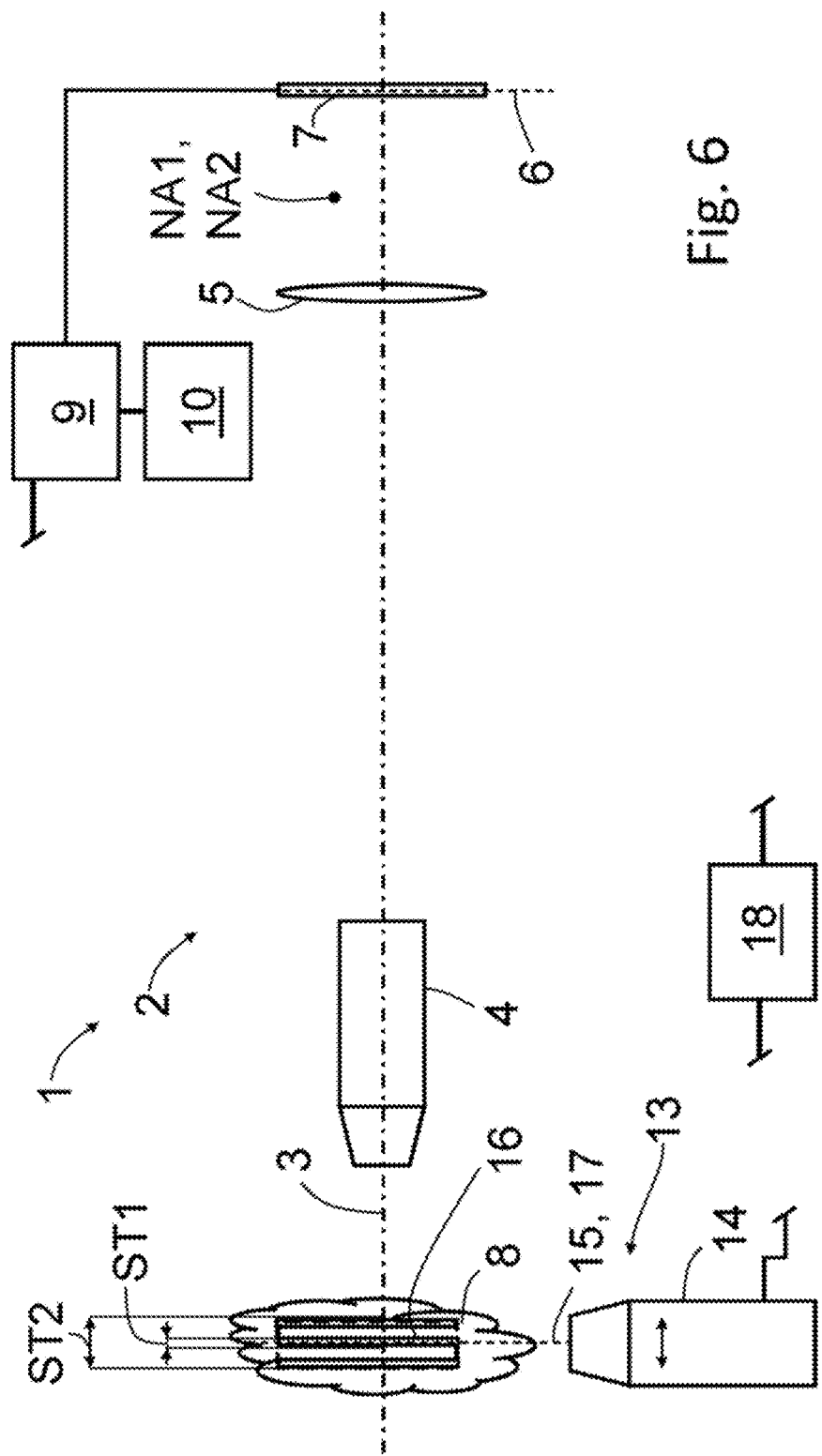
FIG. 6 shows a schematic illustration of a microscope with a scanner.
Figure 7:
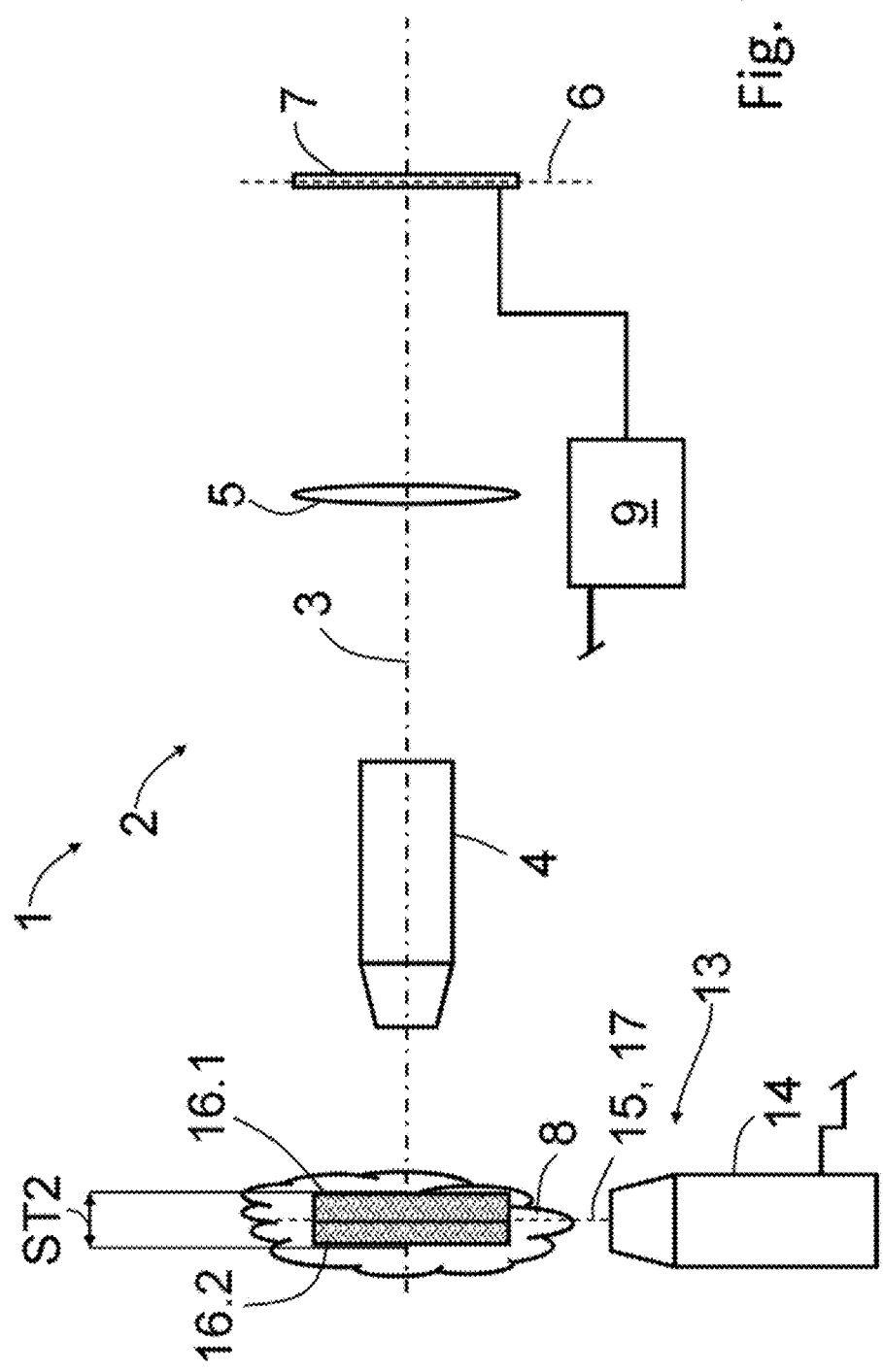
FIG. 7 shows a schematic illustration of a microscope with a detection beam path and an illumination beam path for simultaneously generating at least two light sheets along the detection axis and for capturing detection radiation of both light sheets.
Figure 8:
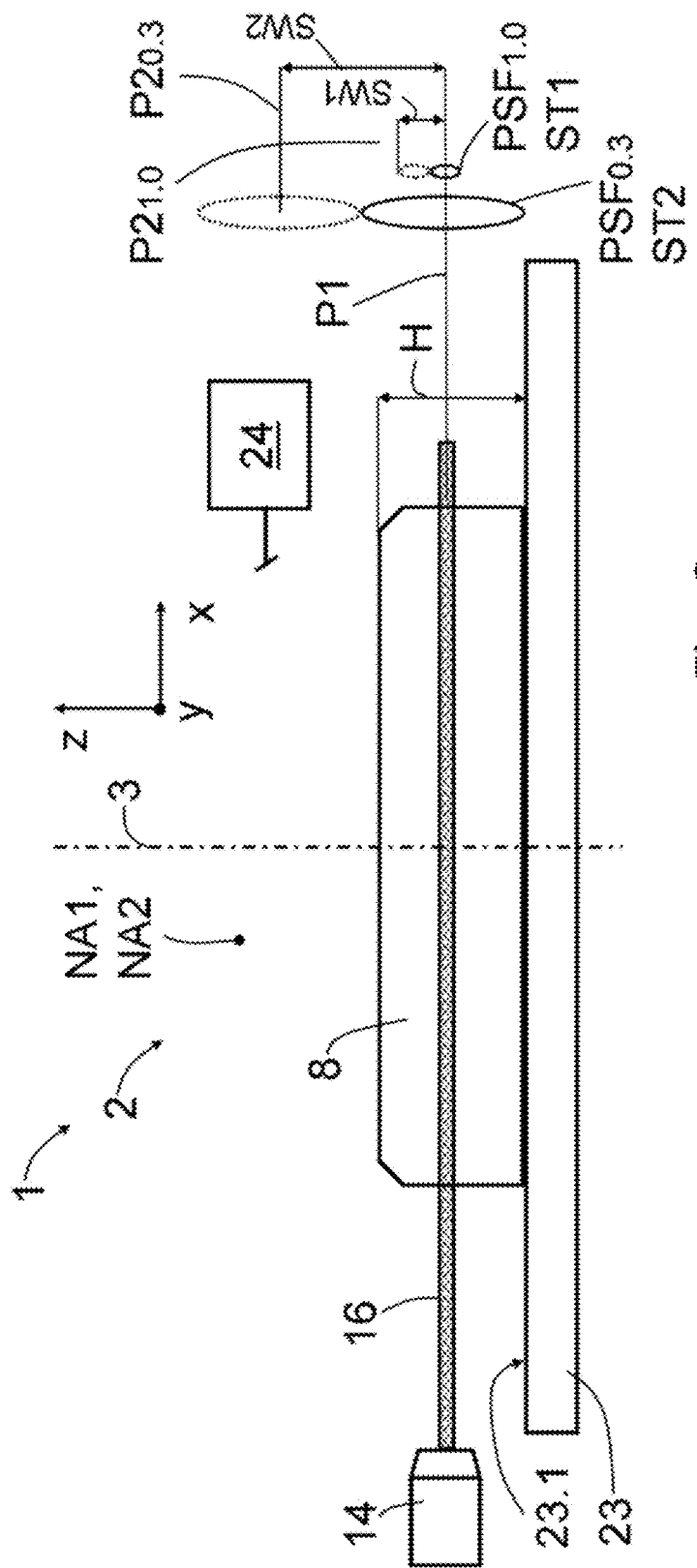
FIG. 8 shows a schematic illustration of a first configuration of the method according to the invention.
Figure 9:
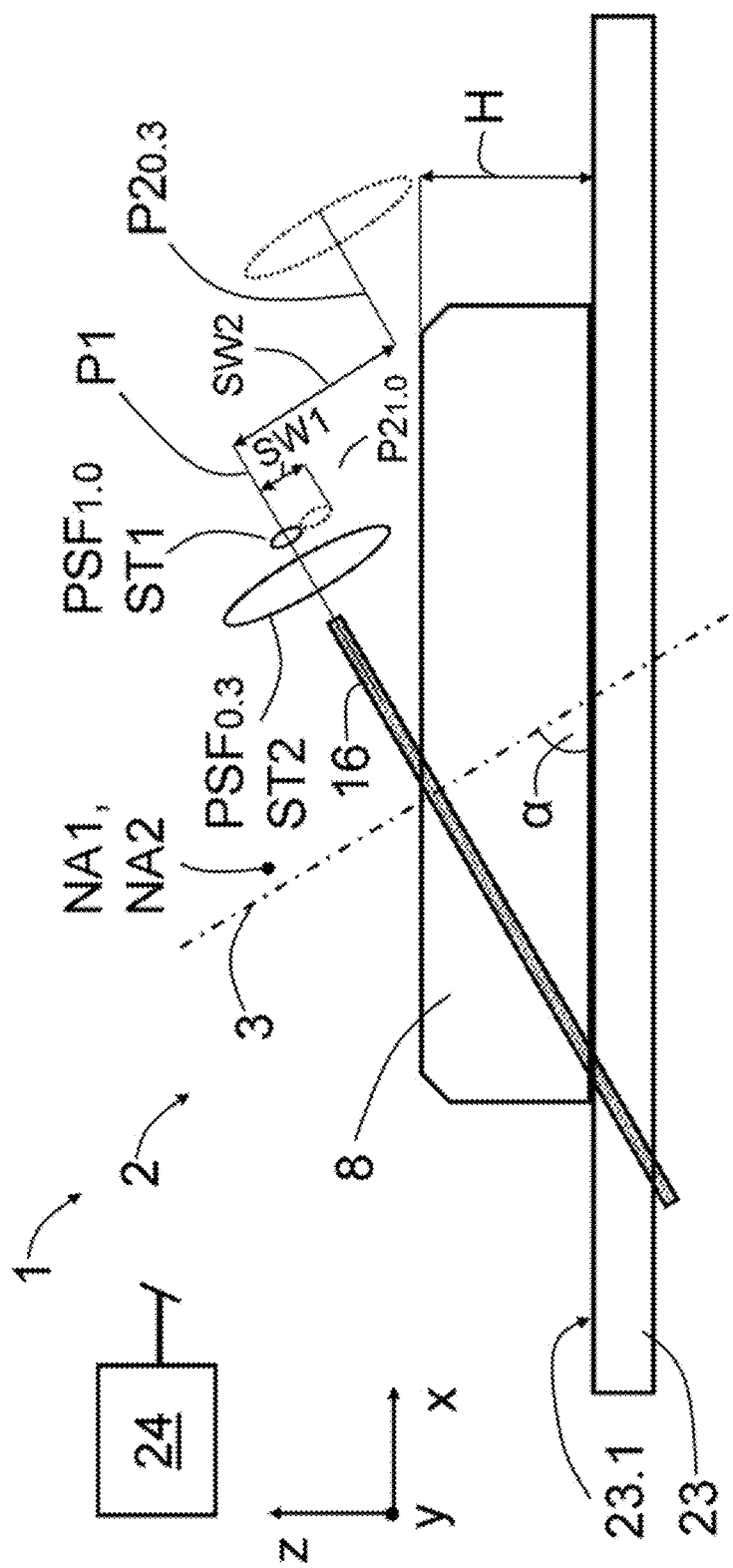
FIG. 9 shows a schematic illustration of a second configuration of the method according to the invention.
Figure 10:
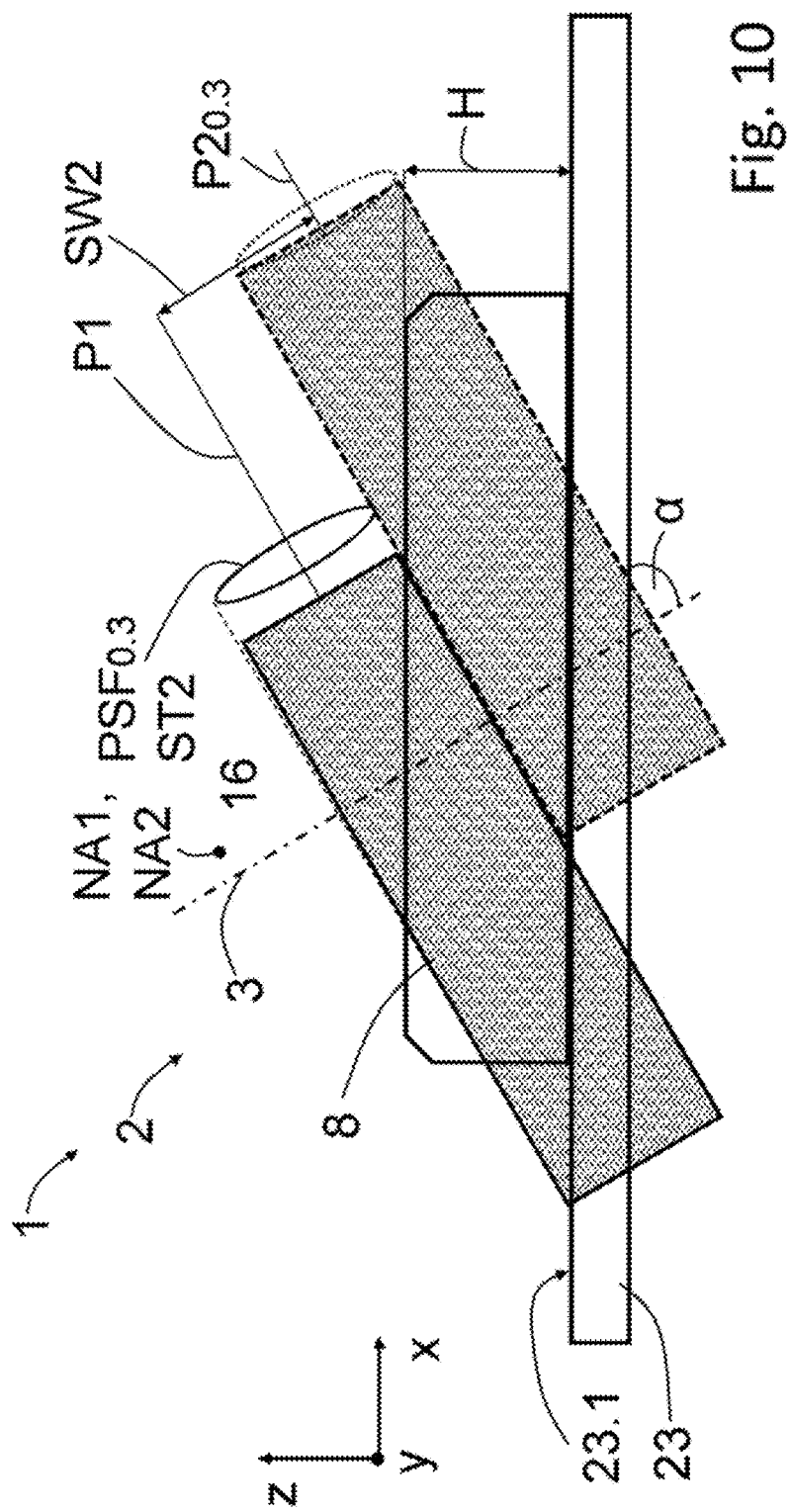
FIG. 10 shows a schematic illustration of carrying out the second configuration of the method according to the invention.

The invention is explained in more detail below on the basis of exemplary embodiments and figures. In the figures:

FIG. 1 shows a schematic illustration of a first exemplary embodiment of a microscope with a detection beam path and an optical element that can be pivoted therein;

FIG. 2 shows a schematic illustration of a second exemplary embodiment of a microscope with a detection beam path and an optical element that can be pivoted therein;

FIG. 3 shows a schematic illustration of a third exemplary embodiment of a microscope with a detection beam path and an optical element that can be pivoted therein;

FIG. 4 shows a schematic illustration of a microscope with a detection beam path and a closable optical element;

FIG. 5 shows a schematic illustration of a microscope with an additional refractive element in the detection beam path between the objective and sample volume;

FIG. 6 shows a schematic illustration of a microscope with a scanner;

FIG. 7 shows a schematic illustration of a microscope with a detection beam path and an illumination beam path for simultaneously generating at least two light sheets along the detection axis and for capturing detection radiation of both light sheets;

FIG. 8 shows a schematic illustration of a first configuration of the method according to the invention;

FIG. 9 shows a schematic illustration of a second configuration of the method according to the invention;

FIG. 10 shows a schematic illustration of carrying out the second configuration of the method according to the invention.

FIGS. 1 to 7 illustrate schematic exemplary embodiments of microscopes 1 which contain modifications for carrying out the method according to the invention. The emphasis here is on the relevant beam paths and technical components, and an illustration of further technical components is dispensed with so as to provide a better overview. The same reference signs denote the same technical elements, unless expressly stated otherwise.

In a first exemplary embodiment (FIG. 1), a detection beam path 2 is present in the microscope 1, an objective 4 for capturing detection radiation, at least one optical lens 5, for example a tube lens, and a detector 7 in an image plane 6 being arranged along a detection axis 3 in said beam path. The detection axis 3 is directed at a sample space, not shown in any more detail, in which a sample to be imaged with a sample volume 8 is placed.

Furthermore, a control unit 9 and a drive 10 are present, by means of which an optical element 11 can be introduced into, and removed from, a pupil plane 12 of the detection beam path 2 in controlled fashion (indicated by the double-headed arrow), The control unit 9 is connected to the detector 7, the drive 10, and an illumination apparatus in a manner suited to the exchange of data. Moreover, the control unit 9 is connected to a display or screen 24, on which the captured image data of the operating states, an overview image and/or raw image data can be displayed.

Further, there is an illumination beam path 13 of the illumination apparatus, only an illumination objective 14 being shown of the latter, by means of which illumination radiation is shaped into a light sheet 16 and directed into the sample volume 8 along an illumination axis 15, The plane of the light sheet 16 determines a sample plane 17 currently to be imaged. The light sheet 16 illuminates the sample plane 17 and generates detection radiation by reflections and/or by exciting light emissions, in particular fluorescence radiation. Part of this detection radiation can be collected by the objective 4, which acts as a detection objective, and can be guided along the detection axis 3 to the detector 7 in the detection beam path 2 and can be captured or imaged there as an image of the detection radiation.

FIG. 1 shows the detection beam path 2 in a first operating state. The optical element 11 is a stop, which is pivoted out of the detection beam path 2. In this first operating state, the detection beam path 2 has a first numerical aperture NA1 (NA1=1.0). On account of this first numerical aperture NA1, the image is captured with a first depth of field ST1 and a lateral image field. The light sheet 16 is located in the region of the first depth of field ST1.

In order to bring about a second operating state of the detection beam path 2, the control unit 9 generates a control command and outputs the latter to the drive 10, which in turn pushes the optical element 11 into the detection beam path 2 (illustrated using a broken solid line). As a result of the action of the optical element 11, the detection beam path 2 now has a second numerical aperture NA2, which is lower (NA2=0.3) than the first numerical aperture NA1. This reduced second numerical aperture NA2 increases the depth of field, and so the detection beam path 2 has a second depth of field ST2. Here, the extent of the lateral image field equals that in the first operating state. In addition or as an alternative thereto, the first and/or the second operating state can also be manually adjustable in further embodiments of the invention.

At the same time, a light sheet 16 is generated in the illumination beam path 15, the extent of which light sheet in the direction of the detection axis 3—also referred to as the thickness—is at least as large as the second depth of field ST2 and which light sheet lies in the region of the second depth of field ST2.

By way of a relative movement with respect to the sample volume 8, the light sheet 16 can now be displaced with increments (see FIGS. 8 to 10) to positions at which partly overlapping or adjoining sample planes 17 are illuminated and images of the sample planes 17 can be captured in each case. The sample volume 18 is able to be scanned more quickly with the light sheets 17 of increased thickness than with a light sheet 16 whose thickness is designed for high-resolution image capture.

In further embodiments of the microscope and further configurations of the method, the optical element 11 could also be a slit stop or rectangular stop instead of a pinhole.

Should the depth of field be changed by applying the EDoF principle, the optical element 11 can be embodied in the form of an annular stop in the pupil plane 12. To implement the EDoF principle, the optical element 11 could also comprise a plurality of elements and, for example, be formed by an axicon and a convex lens disposed downstream of the axicon, as shown symbolically in FIG. 1 in the image insert. If the EDoF principle is applied, the numerical aperture of the detection beam path 2 is not altered or only optionally altered.

In a further embodiment option, the optical element 11 could be a spatial light modulator (SLM), as illustrated in simplified fashion in FIG. 2 (see also King, S. V. et al, (2015), Spatial light modulator phase mask implementation of wavefront encoded 3D computational-optical microscopy; Applied Optics 54: 8587-8595). The optical element comprises a mirror M1, a spatial light modulator SLM, and a mirror M2. The mirror M1 reflects the light onto the spatial light modulator SLM and, from there, back to the detection axis 3 via the mirror M2. The numerical aperture is maintained.

Instead of using a reflecting SLM, such as an LCOS-SLM (LCOS=liquid crystal on silicon), a transmitting SLM could alternatively also be used. The latter is placed into the beam path and controlled accordingly. Mirrors M1, M2 can be dispensed with.

In a further possible embodiment of the microscope 1 and a configuration of the method, the optical element 11 is realized by an arrangement of a plurality of elements, the effect of which causes different orders of diffraction of the collected detection radiation to be separated and focused on different regions of the detector 7 (FIG. 3). After an intermediate image plane 19, the detection radiation reaches the pupil plane 12, which is a Fourier plane at the same time. A multifocal grating 20 is arranged in the pupil plane 12, the effect of the former causing the different orders of diffraction of the detection radiation to be separated. Here, each order of diffraction corresponds to a different sample plane 17. In this configuration of the method, the light sheet 16 contains a plurality of sample planes 17.

Disposed downstream of the multifocal grating 20 are a chromatic correction grating 21, a prism 22, and a lens 52. The chromatic correction grating 21 and the prism 22 correct the chromatic dispersion of the detection radiation, which occurs as a result of the effect of the multifocal grating 20. The lens 52 focuses the orders of diffraction on the different regions of the detector 7.

The optical element 11 remains in the pupil plane 12 in a fourth exemplary embodiment (FIG. 4). The optical element 11 is controllable by means of the control unit 9 and the drive 10 and can be, for example, a stop with an adjustable aperture diameter, with an adjustable rectangular cutout or with an adjustable slit width. A stop on the basis of a liquid crystal element can also be used as adjustable optical element 11. Depending on the control thereof, the resultant aperture can be set.

Using the aforementioned embodiments it is possible to switch between the first depth of field ST1 and the second depth of field ST2 or a further depth of field by changing the numerical aperture of the detection beam path 2.

In a further embodiment of the microscope 1 and of the method for generating the second depth of field ST2, the EDoF principle can be realized by virtue of an optical element 11 in the form of a refractive element, for example a body made of a material transparent to the detection radiation, being arranged between the objective 4 and the sample volume 8 (FIG. 5). Here, the refractive element can have, for example, a refractive index ranging from n=1.0 to 2.0 and a thickness in the direction of the detection axis of between 5 and 100 mm (from WO 2017/075275 A1). In one possible embodiment of the invention, a thin glass plate is used as a refractive element, the refractive index of which is n=1.5, for example, and the thickness of which is d=0.15 to 1 mm, for example. FIG. 3 shows the second operating state, in which the optical element 11 has been pivoted into the detection beam path 2. An elongation of the point spread function in the direction of the detection axis 3 is obtained by the optical effect of the optical element 11, arranged and embodied thus. Once again, the thickness of the light sheet 16 is matched to the first or second operating state and the respective depth of field ST1 or ST2.

Instead of using two light sheets 16.1, 16.2 or a thick light sheet 16 to illuminate the depth of field range, use can also be made of a thin light sheet 16, which is scanned along the optical axis 3 of the detection beam path 2 during the capture period of the detector 7, for example the exposure time of a camera. A scanner 18 is arranged in the illumination beam path 3 for controlled generation of the scanning movement. The scanner 18 is controllable by means of the control unit 9. Since the detector 7 integrates over the capture period, over the exposure time in the case of a camera, this embodiment achieves an effect that corresponds to the use of a thick light sheet. In FIG. 6, such a scanning movement along the optical axis 3 is symbolized by a double-headed arrow in the illumination objective 14.

In further configurations of the method, the second depth of field ST2 can also be caused by virtue of at least two light sheets 16, for example a first light sheet 16.1 and a second light sheet 16.2, being directed into the sample volume 8 at the same time. In the configuration illustrated in simplified fashion in FIG. 7, one light sheet 16 is arranged on each side of the sample plane 17 and parallel to the latter. The light sheets 16 adjoin one another in the sample plane 17 (illustrated with emphasized thick light sheets 16.1, 16.2 for a better overview).

In a further possible configuration, at least two light sheets 16 are arranged offset from one another along the detection axis 3 and perpendicular to the latter (not shown).

The principle of the method according to the invention is explained again on the basis of FIGS. 8 to 10. In a first configuration of the method as per FIG. 8, the detection axis 3 is directed perpendicular to the sample volume 8.

The sample rests on a support surface 23.1 of a sample carrier 23. The support surface 23.1 limits the sample volume 8 in one direction in terms of its possible extent. A Cartesian coordinate system is used for further explanations; the x-axis and the y-axis of which extend orthogonal to one another and, in each case, parallel to the support surface 23.1, while the detection axis 3 extends in the direction of the z-axis. The sample volume 8 has a height H. The light sheet 16 is shown at a first position P1, which it adopts during the first operating state, for example. The light sheet 16 is generated parallel to the support surface 23.1 in an xy-plane, and so only lateral cross sections of the light sheet 16 can be seen in FIGS. 8 to 10. The detection beam path 2 has a first numerical aperture NA1=1.0. In FIG. 8, the associated point spread function $PSF_{1.0}$ is illustrated next to the sample volume 8, schematically as an oval in respect of its lateral (xy-plane) and axial (in the direction of the z-axis)

extent, and it specifies the first depth of field ST1. In order to completely scan the sample volume 8 in the direction of the detection axis 3 with the first numerical aperture NA1, a first increment SW1 would be required, by means of which the light sheet 16 should be displaced relative to the sample volume 8 in the axial direction, for example into a second position $P2_{1.0}$.

By contrast, if the second operating state is established and the detection beam path 2 is operated with a second numerical aperture NA2=0.3, a point spread function $PSF_{0.3}$ arises, which is significantly longer in the axial direction than the point spread function $PSF_{1.0}$ and which specifies the second depth of field ST2.

To completely scan the sample volume 8 in the direction of the detection axis 3, a second increment SW2 would be possible, which is greater than the first increment SW1. The reduction in the required number of instances of image capture and evaluation facilitates a fast provision of an overview image of the sample volume 8.

The first increment SW1 and the second increment SW2 each represent greatest values of increments that permit gap-free scanning of the sample volume 8 by means of the light sheet 16. Shorter increments could also be chosen, with more images having to be captured for a complete scan in that case.

FIG. 9 once again illustrates a sample with a sample volume 8 on a support surface 23.1 of a sample carrier 23. The detection axis 3, along which the detection radiation is collected and guided, is directed at the sample volume 8 in oblique fashion. The detection axis 3 and the support surface 23.1 include an angle α which is α=60° in the exemplary embodiment. As already described in relation to FIG. 8, the first depth of field ST1 in the case of an assumed first numerical aperture NA1=1.0 is smaller than the second depth of field ST2 in the case of an assumed second numerical aperture NA2=0.3 in a second operating state. To completely scan the sample volume 8, the light sheet 16 should be displaced again with the increment SW1 or SW2.

To be able to present to a user of the microscope 1 and user of the method according to the invention an overview image in an xy-plane parallel to the support surface 23.1, the captured image data are converted into this xy-plane and can then be displayed on a display or a screen 24. Alternatively, a three-dimensional representation is possible.

FIG. 10 shows the light sheet 16 at the first position P1 in exemplary fashion. The detection beam path 2 is in the second operating state and has a second depth of field ST2, a numerical aperture NA=0.3, and a corresponding point spread function $PSF_{0.3}$. After capturing the detection radiation at the first position P1, the light sheet 16 is displaced parallel to the support surface 23.1 by the second increment SW2 to the second position $P2_{0.3}$ and detection radiation is captured again. The point spread functions $PSF_{0.3}$ at both positions P1 and $P2_{0.3}$ directly adjoin one another such that a gap-free scan of the sample volume 8 is facilitated despite the large second increment SW2. For elucidation purposes, broken solid lines delimit the sections of the sample volume 8 that are captured at the positions P1 and $P2_{0.3}$.

The displacement of the light sheet 16 between the individual positions P1 and $P2_{0.3}$ along the detection axis 3 and parallel to the support surface 23.1 leads to "slices" of image data arranged next to one another, which can be projected into the xy-plane or represented in three-dimensional fashion with little computational outlay.

REFERENCE SIGNS

1 Microscope
2 Detection beam path
3 Detection axis
4 Objective
5 Optical lens
6 Image plane
7 Detector
8 Sample volume
9 Control unit
10 Drive
11 Optical element
12 Pupil plane/Fourier plane
13 illumination beam path
14 illumination objective
15 illumination axis
16 Light sheet
16.1 First light sheet
16.2 Second light sheet
17 Sample plane
18 Scanner
19 intermediate image plane
20 Multifocal grating
21 Chromatic correction grating
22 Prism
23 Sample carrier
23.1 Support surface
24 Screen
52 Optical lens
BS Beam splitter
H Sample height
M Mirror
P1 First position of the light sheet
P2 Second position of the light sheet
PSF Point spread function
SLM Spatial light modulator
ST1 First depth of field
ST2 Second depth of field
SW Increment
α Angle (between detection axis 3 and support surface 23.1)

The invention claimed is:

1. A method for generating an overview image using a high-aperture objective, comprising:
   providing an optical detection beam path with the high-aperture objective, wherein the optical detection beam path, in a first operating state, has a first numerical aperture and a first depth of field located substantially in a focal plane of the optical detection beam path, wherein an image of detection radiation is captured or is capable of being captured with the first depth of field and with a lateral image field in the first operating state, the detection radiation being caused by virtue of at least one light sheet being directed along an illumination axis into a sample volume to be imaged, which is situated in a sample space;
   transferring the optical detection beam path into a second operating for producing the overview image state by virtue of the first depth of field being increased to a second depth of field, wherein the high-aperture objective remains in the optical detection beam path, wherein transferring the optical detection beam path into the second operating state includes changing at least one parameter of an optical element in the optical detection beam path or adjacent the sample to generate the second depth of field, the optical element different from the high-aperture objective and the second depth of field brought about by virtue of the first numerical aperture of the optical detection beam path being reduced to a second numerical aperture, wherein a thickness of the at least one light sheet is adapted to the second depth of field in such a way that the thickness of the at least one light sheet corresponds to at least the second depth of field;

capturing the detection radiation in the second operating state, wherein the detection radiation coming from the sample space is collected by the high-aperture objective, guided along the optical detection beam path, and captured by at least one detector, which is sensitive to the detection radiation, as an overview image with the lateral image field, wherein the lateral image field is the same in the first operating state and the second operating state;

selecting a section (ROI, region of interest) for a high-resolution image capture from the overview image; and capturing said high-resolution image by establishing the first operating state and imaging a detection radiation of the selected section.

2. The method as claimed in claim 1, wherein the thickness of the at least one light sheet equals the second depth of field in the second operating state.

3. The method as claimed in claim 1, wherein the second depth of field is increased by at least a factor of two in relation to the first depth of field.

4. The method as claimed in claim 3, wherein the second depth of field is increased in relation to the first depth of field by a factor ranging between two and 10.

5. The method as claimed in claim 1, wherein the first numerical aperture is reduced by a factor of 0.5 or less to the second numerical aperture.

6. The method as claimed in claim 5, wherein the first numerical aperture is reduced by a factor of 0.3 to the second numerical aperture.

7. The method as claimed in claim 1, wherein the at least one light sheet is scanned along a detection axis of the optical detection beam path during a capture period of the detector in order to illuminate a depth of field range of the first depth of field or the second depth of field, wherein a scanner arranged in an illumination beam path and controllable by a control unit is used to generate a scanning movement of illumination radiation.

8. The method as claimed in claim 1, wherein an optical element in a form of a pinhole, slit stop, or a rectangular stop, is introduced into a pupil plane of the optical detection beam path, and wherein an effect of the optical element is bringing about the second numerical aperture of the optical detection beam path.

9. The method as claimed in claim 1, wherein the second depth of field is based on the changed parameter of the optical element and of capturing the detection radiation from a plurality of mutually parallel sample planes at a same time.

10. The method as claimed in claim 1, wherein the sample volume to be imaged is illuminated along the illumination axis by a first light sheet and at least one further light sheet arranged parallel to the first light sheet, wherein the wherein the first and at least one further light sheets lie in succession and overlap at most in part along the detection axis perpendicular to the illumination axis.

11. The method as claimed in claim 3, wherein the second depth of field is increased in relation to the first depth of field by a factor ranging between 4 and 9.

12. The method as claimed in claim 1, wherein:
the at least one parameter corresponds to a position of the optical element relative to the optical detection beam path, and
the optical detection beam path changes from the first operating state to the second operating state when the position of the optical element changes.

13. The method as claimed in claim 12, wherein:
the optical detection beam path is in the first operating state when the position of the optical element is outside the optical detection beam path, and
the optical detection beam path is in the second operating state when the position of the optical element is in the optical detection beam path.

14. The method as claimed in claim 12, wherein the optical element includes a spatial light modulator.

15. The method as claimed in claim 12, wherein the optical element includes a diffractor.

16. The method as claimed in claim 1, wherein the optical element is in the optical detection beam path in the first operating state and the second operating state.

17. The method as claimed in claim 16, wherein the optical element includes a refractor.

18. The method as claimed in claim 1, wherein the optical element incudes the at least one light sheet.

19. The method as claimed in claim 18, wherein the at least one parameter corresponds to a position of the at least one light sheet.

20. A method for generating an overview image, comprising:
controlling an optical detection beam path to have a first operating state;
changing the optical detection beam path to have a second operating state; and
changing a size of a light sheet based on the second operating state,
wherein changing the optical detection beam path to have the second operating state includes changing a parameter of an optical element in the optical detection beam path, and
wherein the optical element has a first numerical aperture and a first depth of field in the first operating state and a second numerical aperture and a second depth of field in the second operating state, the size of the light sheet changed to correspond to the second depth of field.

* * * * *

UNITED STATES PATENT AND TRADEMARK OFFICE
CERTIFICATE OF CORRECTION

PATENT NO. : 11,327,288 B2
APPLICATION NO. : 17/052560
DATED : May 10, 2022
INVENTOR(S) : Jakob Haarstrich et al.

It is certified that error appears in the above-identified patent and that said Letters Patent is hereby corrected as shown below:

In the Specification

Column 1, Line 11 currently reads:
"No, 10 2018 210 603.7, filed on June 28, 2018."
And should read:
-- No. 10 2018 210 603.7, filed on June 28, 2018. --;

Column 2, Line 41 currently reads:
"detection beam path, Using the detection beam path"
And should read:
-- detection beam path. Using the detection beam path --;

Column 3, Line 57 currently reads:
"wave-optical depth of field, A calculation"
And should read:
-- wave-optical depth of field. A calculation --;

Column 4, Line 27 reads:
"Fold faster creation"
And should read:
-- fold faster creation --;

Column 4, Line 35 reads:
"S. V. et al. (2015)"
And should read:
-- S.V. et al., (2015) --;

Column 5, Line 10 currently reads:
"(US 2012/0224034 A1):"

Signed and Sealed this
Sixteenth Day of May, 2023

*Katherine Kelly Vidal*
Katherine Kelly Vidal
*Director of the United States Patent and Trademark Office*

And should read:
-- (US 2012/0224034 A1). --;

Column 8, Line 11 reads:
"arrow), The control unit"
And should read:
-- arrow). The control unit --;

Column 8, Line 22 currently reads:
"illumination axis 15, The plane of"
And should read:
-- illumination axis 15. The plane of --;

Column 8, Line 56 currently reads:
"illumination beam path 15, the extent of which"
And should read:
-- illumination beam path 13, the extent of which --;

Column 8, Line 66 currently reads:
"The sample volume 18 is able"
And should read:
-- The sample volume 8 is able --;

Column 8, Line 67 currently reads:
"the light sheets 17 of increased"
And should read:
-- the light sheets 16 of increased --;

Column 9, Line 18 currently reads:
"King, S. V. et al,"
And should read:
-- King, S. V. et al., --;

Column 10, Line 23 currently reads:
"optical axis 3 of the detection beam"
And should read:
-- optical detection axis 3 of the detection beam --;

Column 10, Line 26 currently reads:
"path 3 for controlled generation"
And should read:
-- path 13 for controlled generation --;

Column 10, Line 32 currently reads:
"optical axis 3"

And should read:
-- detection axis 3 --;

Column 12, Line 11 currently reads:
"13 illumination beam path"
And should read:
-- 13 Illumination beam path --;

Column 12, Line 12 currently reads:
"14 illumination objective"
And should read:
-- 14 Illumination objective --;

Column 12, Line 13 currently reads:
"15 illumination axis"
And should read:
-- 15 Illumination axis --;

Column 12, Line 19 currently reads:
"19 intermediate image plane"
And should read:
-- 19 Intermediate image plane --;

In the Claims

Column 13, Line 26, Claim 4 reads:
"...ranging between two and 10."
And should read:
-- ...ranging between 2 and 10. --;

Column 13, Line 49, Claim 9 reads:
"optical element and of capturing"
And should read:
-- optical element and capturing --;

Column 14, Lines 1-2, Claim 10 reads:
"wherein the wherein the first and at least"
And should read:
-- wherein the first and at least --;

Column 14, Line 32, Claim 18 reads:
"element incudes the at least one light sheet."
And should read:
-- element includes the at least one light sheet. --.